W. T. RICHARDSON.
PLOW.
APPLICATION FILED JUNE 17, 1918.
1,319,619.
Patented Oct. 21, 1919.
2 SHEETS—SHEET 1.
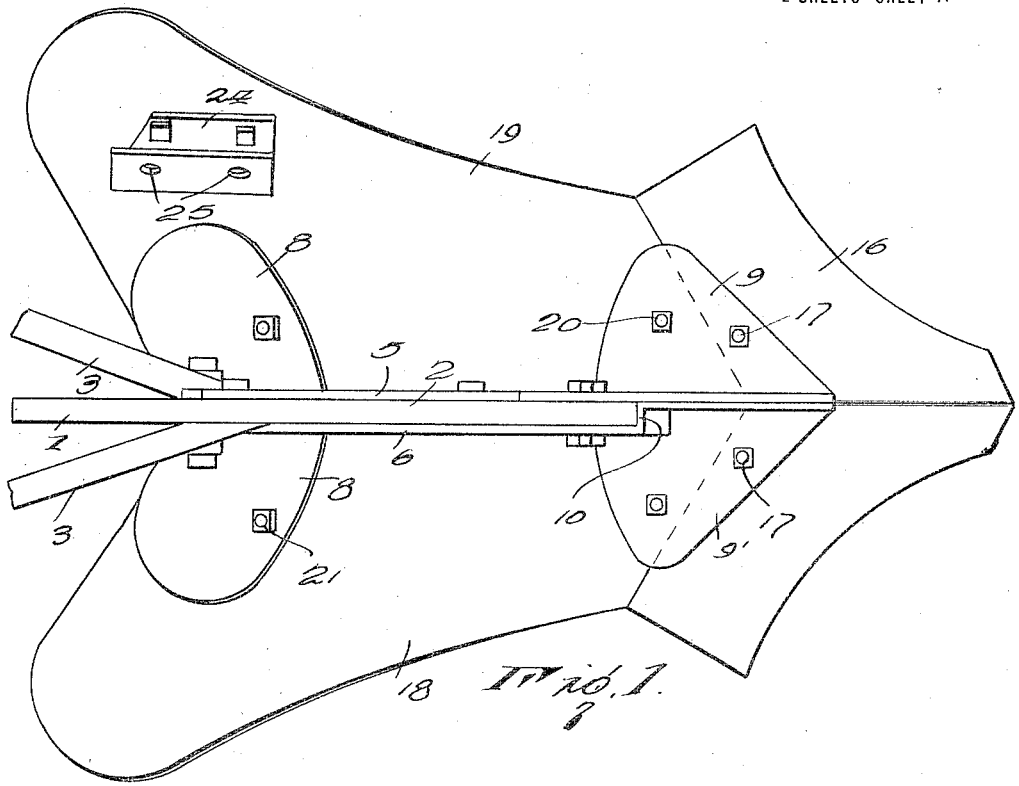
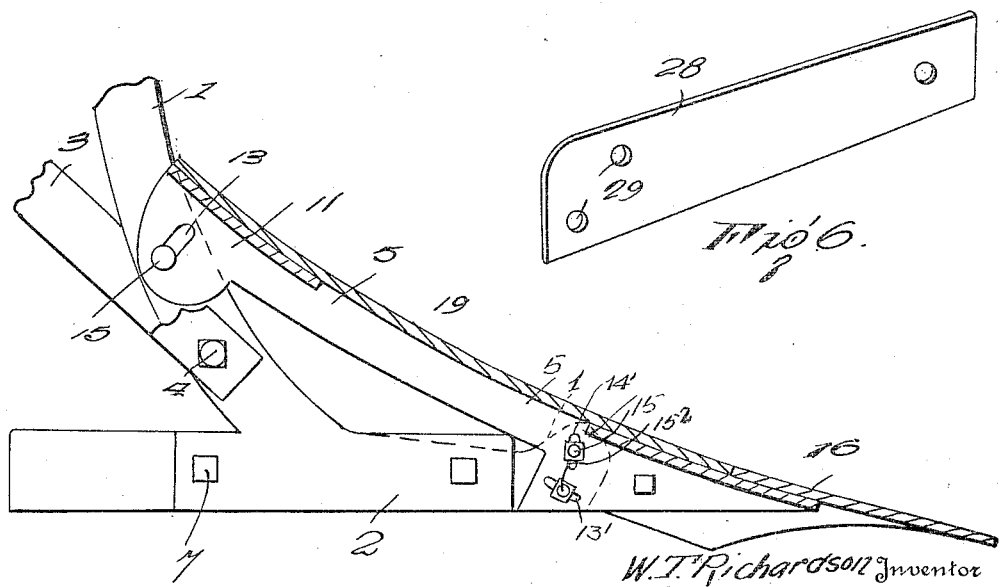
W. T. Richardson, Inventor
By Geo. P. Kimmel
Attorney

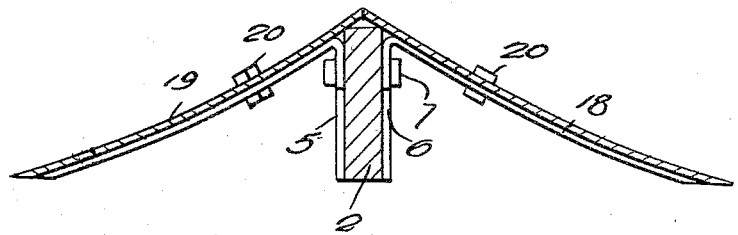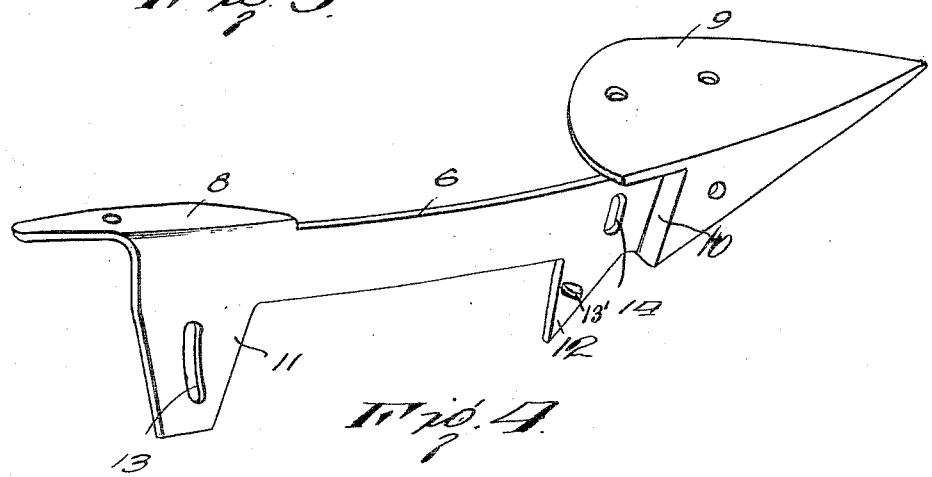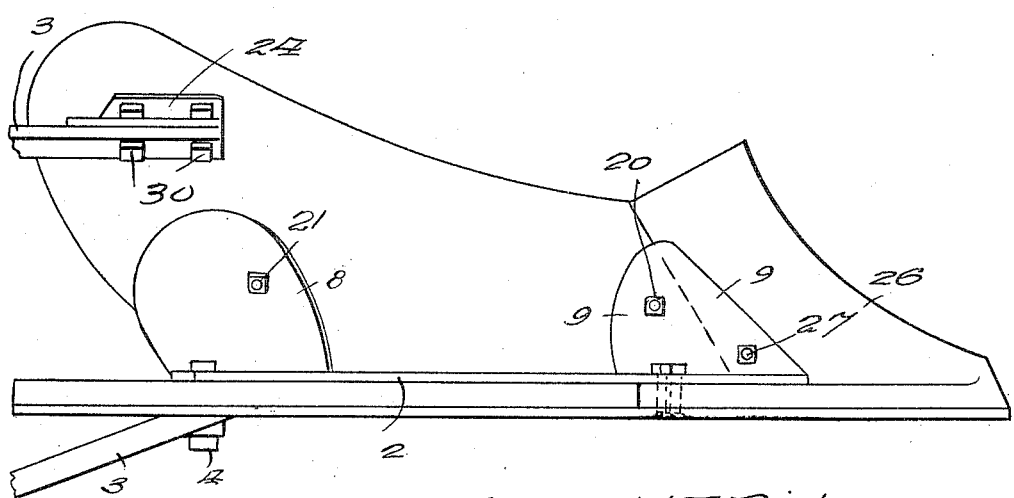

UNITED STATES PATENT OFFICE.

WILLIAM T. RICHARDSON, OF GRAPEVINE, TEXAS.

PLOW.

1,319,619.  Specification of Letters Patent.  Patented Oct. 21, 1919.

Application filed June 17, 1918. Serial No. 240,438.

*To all whom it may concern:*

Be it known that I, WILLIAM T. RICHARDSON, a citizen of the United States, residing at Grapevine, in the county of Tarrant and State of Texas, have invented certain new and useful Improvements in Plows, of which the following is a specification.

This invention relates to improvements in plows and it is the principal object of the invention to provide a novel form of plow which can, by slight alteration, be converted into an ordinary turning plow or shovel or so called "middle buster" plow, thus effecting a material saving upon part of a user.

It is also an object of the invention to provide a plow, the wings of which can be adjusted to engage the soil at different angles and vary the passage of the soil thereover.

Other objects will be in part obvious and in part pointed out hereinafter.

The improvements in the details and arrangements of parts will be apparent from an inspection of the accompanying drawings, in connection with the specific description hereinafter contained, and wherein the preferred embodiments of the invention are shown for the purpose of imparting a full understanding of the same.

In the drawings:

Figure 1 is a bottom plan of the improved plow,

Fig. 2 is a fragmentary vertical longitudinal section therethrough,

Fig. 3 is a vertical transverse section therethrough,

Fig. 4 is a detail in perspective of one of the wing securing brackets,

Fig. 5 is a bottom plan view of a slightly modified form of the plow, and

Fig. 6 is a detail in perspective of the land side attachment.

Referring now more specifically to the drawings, in connection with which like reference characters will designate corresponding parts throughout the several views, 1 represents a portion of the plow beam and 2 the foot thereof, said beam having handles 3 secured thereto at a point in proximity to the foot by passing a bolt 4 or other suitable fastening device therethrough into engagement with the adjacent ends of said handles.

Brackets 5 and 6 are bolted to the opposite sides of the foot 2 as at 7 and are provided with laterally extending pieces 8 and 9 formed with openings, the purpose of which will be presently described. In this connection, it is to be noted that the bracket 6 is slightly offset at 10 to permit the same to be engaged over the adjacent end of the foot 2 and to allow the ends of the brackets to engage each other. Enlargements 11 and 12 are also formed on the opposite ends of the brackets 5 and 6, the enlargement 11 being formed with an arcuate substantially vertical slot 13 while the enlargement 12 is formed with a similar slot 14; the slot 13 in the enlarged end 11 of the bracket 5 and the slot 14 of the bracket 6 receiving a connecting bolt 15 therethrough, which bolt as will be noted is passed through an adjacent portion of the beam 1. The enlargements 11 are provided with a slot 13, while the enlargements 12 are each provided with slots 14 and 13' for receiving bolts 15 and 15' and $15^2$, respectively, the bolt 15 likewise passing through the intervening portion of the beam 1.

A plow point 16 is arranged upon the lateral extensions 9 of the brackets 5 and 6 and is connected thereto by passing bolts 17 through the same.

Wings 18 and 19 are also provided, as will be noted, bearing at their forward ends against the rear faces of the share. The lateral extensions 9 adjacent the plow point 16 are secured thereto by bolts 20 passing therethrough, while the remaining ends of the wings are arranged on the lateral extensions 8 and are connected thereto by bolts 21 passing through the same. Obviously, by securing the forward ends of the brackets 5 and 6 to the foot in the manner shown, vertical and longitudinal adjustment of the same will be permitted and as a consequence, the angle at which the plow point 16 engages the soil can be varied, as well as the positioning of the several wings 18 and 19, thus varying the passage of the earth thereover.

To the underside of the wing 19 at a point in proximity to one end thereof there is secured a substantially U-shaped bracket 24, the free portion of which is formed with openings 25, the purpose of which will be hereinafter described.

In Fig. 5 I have shown the improved device arranged as a turning plow. To transform the device into a turning plow, it is only necessary to remove the plow point 16 and the bracket 6, together with the wing 18. At this time, a single plow point 26 is secured to the forward extremity of the bracket 5 by passing a bolt 27 through the extension 9 thereof; the rear marginal portion of said point being arranged adjacent the forward marginal portion of the wing 19. A land side piece 28 is now arranged adjacent the exposed side of the foot 2, the same being secured thereto by passing bolts through the openings 29 therein and through complementally disposed openings formed in the foot. To reduce side pull to minimum on the form of turning plow so provided, one of the handles 3 is disengaged from the beam 1 and is secured to the bracket 24 by passing bolts 30 through the openings 25 therein.

From the foregoing, it will be readily understood by persons skilled in the art that I have provided an exceedingly convenient, efficient and simple form of plow construction, which by slight alteration can be converted into a usual turning plow or the so called "middle buster" plow. Furthermore, the construction of the plow beam and the foot arranged thereon is such as to permit the disengagement of the brackets 5 and 6 together with the wings 18 and 19 and the points in order to allow the engagement of various forms of cultivating devices therewith, such as conditions or preference may dictate. In this way, it is obvious that a material saving upon part of a user will be effected.

Manifestly, the construction shown is capable of considerable modification and such modification as is within the scope of my claims, I consider within the spirit of my invention.

I claim:

1. In a plow, a beam device including a foot portion and a standard portion, a bracket having lateral forward and rear extensions and vertical forward and rear extensions, said vertical extensions secured respectively to the foot and to the standard portions, a share member secured to the forward lateral extension and a moldboard member secured to the forward and rearward lateral extensions and supported intermediate the ends of the bracket.

2. In a plow, a beam device including a foot portion and a standard portion, a shoe attached to the foot portion and extended in advance of the same, a bracket having lateral forward and rear extensions and vertical forward and rear extensions, said vertical extensions secured respectively to the forwardly extending part of the shoe and to the standard, a share member secured to the forward lateral extension, and a moldboard member secured to the forward and rearward lateral extensions and supported intermediate the ends by the bracket.

3. In a plow, a beam device including a foot portion and a standard portion, coacting bracket devices bearing upon opposite sides of the beam and having oppositely directed lateral forward and rear extensions and vertical forward and rear extensions, one of the said brackets having an offset to engage the forward end of the foot portion and the vertical extension secured respectively to the foot and to the standard, moldboards engaging at their inner edges and secured to the forward and rearward lateral extensions and supported intermediate the ends of the brackets.

WILLIAM T. RICHARDSON.

Copies of this patent may be obtained for five cents each, by addressing the "Commissioner of Patents, Washington, D. C."